United States Patent
Nakamura (10) Patent No.: US 9,327,869 B2
(45) Date of Patent: May 3, 2016

(54) JOINT MEMBER AND PACKING BOX CONNECTED BY MEANS OF THE SAME

(71) Applicant: KYOCERA Document Solutions Inc., Osaka (JP)

(72) Inventor: Toshiyuki Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 19 days.

(21) Appl. No.: 14/334,372

(22) Filed: Jul. 17, 2014

(65) Prior Publication Data

US 2015/0056011 A1 Feb. 26, 2015

(30) Foreign Application Priority Data

Aug. 26, 2013 (JP) .................................. 2013-174748

(51) Int. Cl.
*B65D 8/00* (2006.01)
*B65D 19/20* (2006.01)
*B65D 81/05* (2006.01)
*F16B 2/22* (2006.01)

(52) U.S. Cl.
CPC .............. *B65D 19/20* (2013.01); *B65D 81/056* (2013.01); *B65D 2519/00019* (2013.01); *B65D 2519/00054* (2013.01); *B65D 2519/00089* (2013.01); *B65D 2519/00159* (2013.01); *B65D 2519/00273* (2013.01); *B65D 2519/00318* (2013.01); *B65D 2519/00343* (2013.01); *B65D 2519/00497* (2013.01); *B65D 2519/00661* (2013.01); *B65D 2519/00815* (2013.01); *F16B 2/22* (2013.01); *Y10T 24/44026* (2015.01); *Y10T 403/75* (2015.01)

(58) Field of Classification Search
CPC ... Y10T 24/42; Y10T 24/44026; Y10T 24/50; Y10T 24/505; F16B 5/0642; B65D 5/4283
See application file for complete search history.

(56) References Cited

U.S. PATENT DOCUMENTS

| | | | | | |
|---|---|---|---|---|---|
| 936,148 | A | * | 10/1909 | McConnell | A44B 11/2542 24/110 |
| 3,875,843 | A | * | 4/1975 | Maeda | F16B 19/1081 229/125.21 |
| 6,164,603 | A | * | 12/2000 | Kawai | F16L 3/23 24/297 |
| 6,412,153 | B1 | * | 7/2002 | Khachadourian | F16B 5/0664 24/614 |

(Continued)

FOREIGN PATENT DOCUMENTS

| | | |
|---|---|---|
| JP | S 53-110211 | 9/1978 |
| JP | S 58-84331 A | 5/1983 |

(Continued)

*Primary Examiner* — Matthieu Setliff
(74) *Attorney, Agent, or Firm* — Stein IP, LLC (57) ABSTRACT

A joint member includes a base member and a key member. The base member includes: a cylindrical portion having a first opening at one end and second opening at other end that is inserted into the through-hole; a flange portion that is formed around a first opening of the cylindrical portion; hook members that are connected to opposite inner walls of the cylindrical portion; a rib that is formed on at least one of the hook members and extends toward the first opening. The key member includes: a pushing portion that is insertable into the cylindrical portion through the first opening, butts against the rib portion to rotate the hook member toward the second opening. When the pushing portion is inserted in the cylindrical portion, the flange portion and the hook member sandwich the packing members, and the ribs close the opening at the other end of the cylindrical portion.

4 Claims, 10 Drawing Sheets

(56) References Cited

U.S. PATENT DOCUMENTS

| | | | | |
|---|---|---|---|---|
| 7,240,406 B1* | 7/2007 | Liverman | ............... | F16B 5/0642 24/614 |
| 7,480,968 B2* | 1/2009 | Maresh | ................. | F16B 5/0642 24/453 |
| 7,870,653 B2* | 1/2011 | Maresh | ................... | H01P 1/387 24/614 |
| 7,908,719 B2* | 3/2011 | Liverman | ............... | F16B 5/0642 220/324 |
| 8,118,188 B2* | 2/2012 | Xin | ....................... | B65D 5/4283 220/324 |
| 8,308,012 B2* | 11/2012 | Xin | ....................... | B65D 5/4283 215/355 |
| 2007/0234531 A1* | 10/2007 | Maresh | ................. | F16B 5/0642 24/614 |
| 2009/0144951 A1* | 6/2009 | Liverman | ............... | F16B 5/0642 24/614 |
| 2009/0211068 A1* | 8/2009 | Xin | ....................... | B65D 5/4283 24/458 |
| 2009/0229092 A1* | 9/2009 | Xin | ....................... | B65D 5/4283 24/458 |
| 2010/0005635 A1* | 1/2010 | Liverman | ............... | F16B 5/0642 24/614 |

FOREIGN PATENT DOCUMENTS

| | | |
|---|---|---|
| JP | S 63-67246 A | 3/1988 |
| JP | 6-55621 A | 3/1994 |

\* cited by examiner

JOINT MEMBER AND PACKING BOX CONNECTED BY MEANS OF THE SAME

INCORPORATION BY REFERENCE

The present application is based on Japanese Patent Application No. 2013-174748, filed Aug. 26, 2013, the contents of which are hereby incorporated by reference.

BACKGROUND OF THE INVENTION

The present disclosure relates to a joint member that is inserted into holes, which are formed through packing members such as, for example, a cardboard or the like and aligned with each other, to connect the packing members, separated in two or more parts, with each other.

Figure 11:
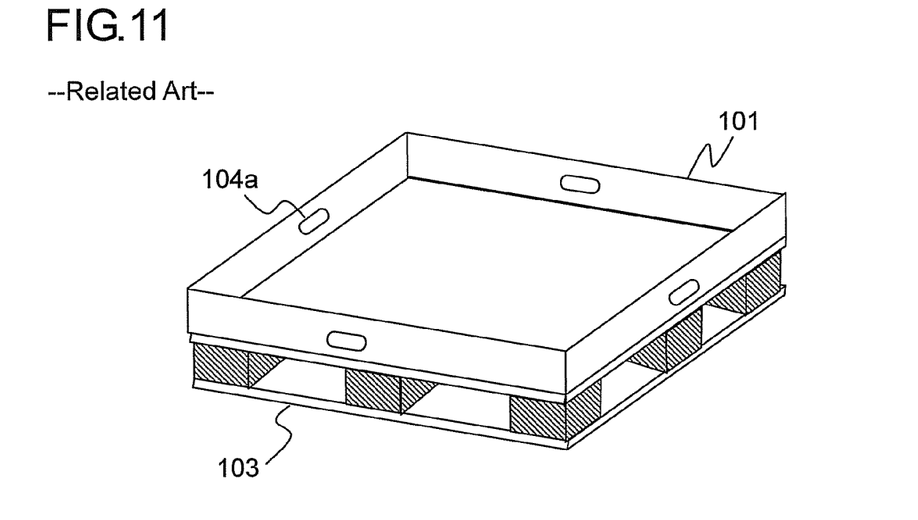
FIG. 11 is a perspective view of a lower box 101 of a conventional C-type packing box 100.
Figure 12:
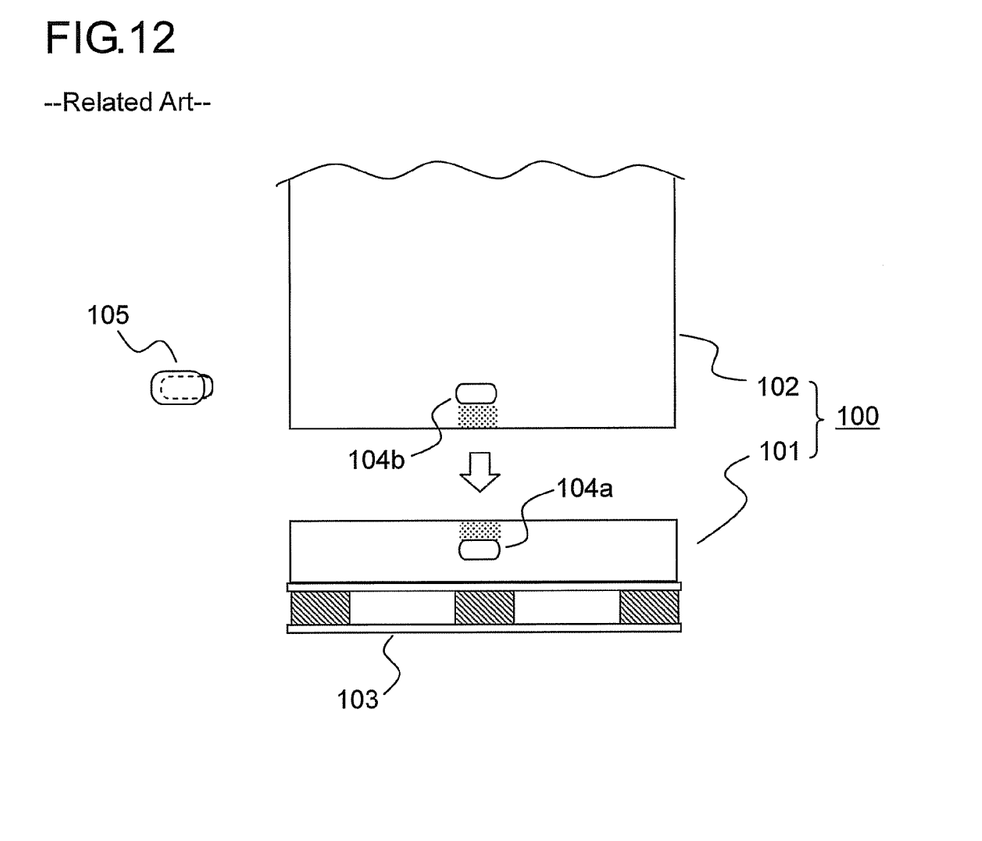
FIG. 12 is a side view showing a state where the conventional C-type packing box 100 is used to pack a product.

Conventionally, a so-called C-type packing casing, in which a product is put on a pallet and covered with an upper box, is widely used in a case where a large and heavy product such as an electronic device or the like is packed. An example of the conventional C-type packing box is shown in FIG. 11 and FIG. 12. A packing box 100 is composed of a lower box 101 and an upper box 102, and a pallet 103 is attached to a bottom surface of the lower box 101. Besides, each side surface of the lower box 101 is provided with a through-hole 104a through a central portion. A using method of such packing box 100 is shown in FIG. 12. First, an article to be packed (not shown) is put on the lower box 101 and covered with the cylindrical upper box 102.

A through-hole 104b is formed through a lower portion of the upper box 102 at a position corresponding to the through-hole 104a of the lower box 101, the through-holes 104a and 104b are aligned with each other, a fastener 105 is inserted into the aligned through-holes 104a and 104b, whereby the lower box 101 and the upper box 102 are integrally connected to each other. By using such lower box 101 to which the pallet 103 is attached, it is unnecessary to further put the packing box 100 on the pallet 103 after a product is packed; accordingly, it becomes easy to pack and transport an especially large product and the like.

A method is devised, in which the fastener for connecting the lower box 101 and the upper box 102 is easily removed when unpacking such C-type packing box. For example, a joint member is known, which has a base member (base body), which has a cylindrical portion; a flange portion formed at an end of the cylindrical portion; and a pair of hook members connected to opposite inner walls of the cylindrical portion via a hinge portion, and a key member (key body) which has a pushing portion insertable into the cylindrical portion of the base member.

SUMMARY OF THE INVENTION

A joint member according to an aspect of the present disclosure is a joint member that comprises a base member and a key member and is inserted into aligned through-holes of two or more packing members with the two or more packing members overlaid on each other to connect the packing members. The base member includes: a cylindrical portion having a first opening at one end and second opening at other end that is inserted into the through-hole; a flange portion that is formed on a peripheral portion of the first opening; a pair of hook members that are connected to opposite inner walls of the cylindrical portion, each hook member has a base portion which is connected to the inner wall and extends from the inner wall in opposite directions and bent into an L shape from the base portion toward the second opening; each of the hook members is swingable to the inner wall via the base portion as a first hinge portion; a rib that is formed on at least one of the hook members and extends from the bent portion of the hook member toward the first opening. The key member includes: a pushing portion that is insertable and removable into and from the cylindrical portion of the base member through the first opening, comes into contact with the rib portion when being inserted into the cylindrical portion to rotate the hook member toward the second opening. In a state where the pushing portion is inserted in the cylindrical portion, the hook member rotates, about the first hinge portion as a pivotal shaft, toward the second opening, the flange portion and the hook member sandwich the two or more packing members, and the ribs close the second opening.

Still other objects of the present disclosure and specific advantages obtained by the present disclosure will become more apparent from the following description of a preferred embodiment.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
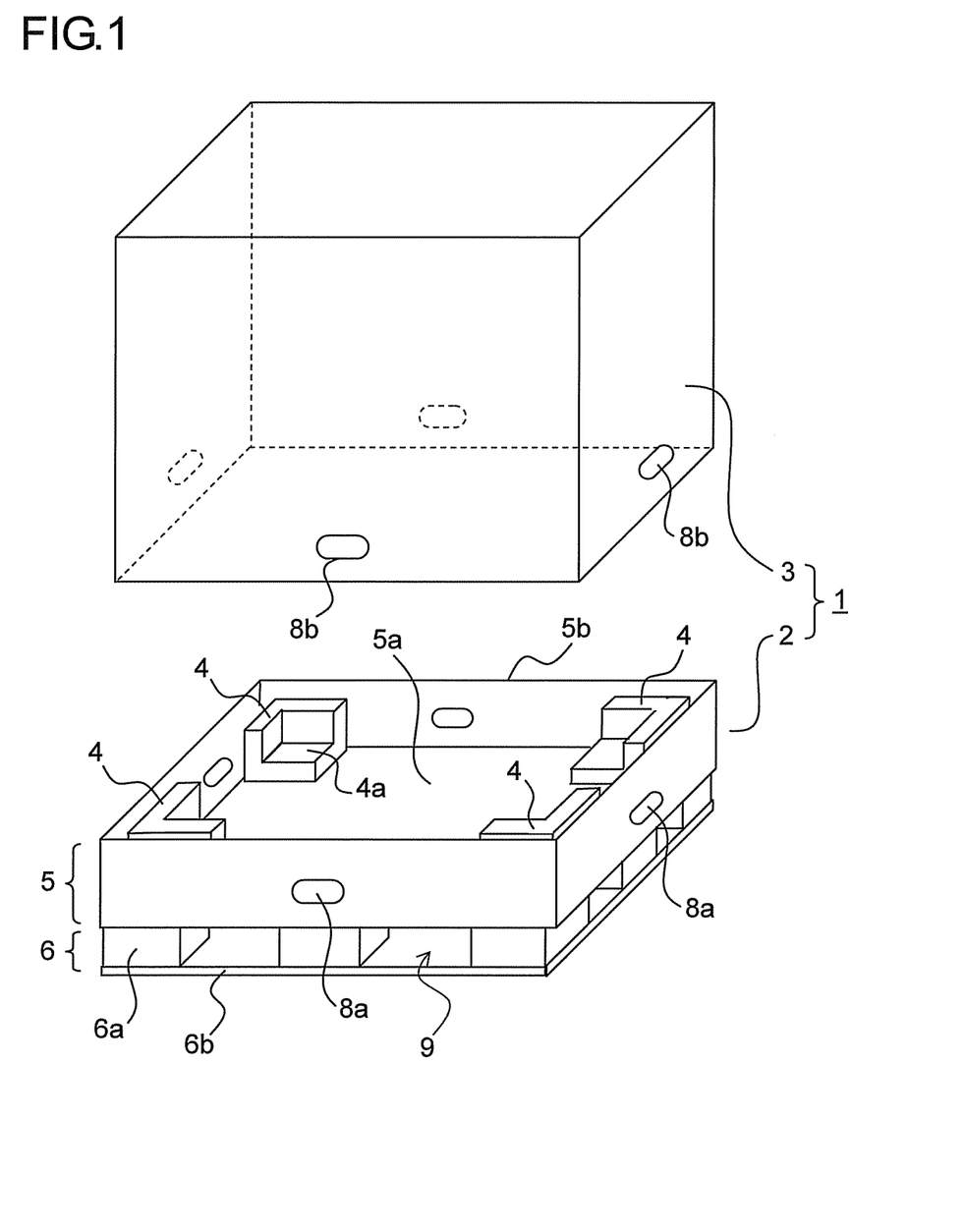
FIG. 1 is an exploded perspective view showing an example of a packing box 1 to which a joint member 10 according to the present disclosure is attached

Hereinafter, an embodiment of the present disclosure is described with reference to the drawings. FIG. 1 is a perspective view showing a structural example of the packing box 1 to which the joint member 10 according to the present disclosure is attached. The packing box 1 is composed of: a tray-equipped pallet 2; an upper box 3 which covers side surfaces and an upper surface of an article to be packed and whose bottom surface is opened; and a cardboard buffer member 4 that is disposed on the tray-equipped pallet 2 to protect an article to be packed from an external impact. The buffer member 4 is provided with a product placement surface 4a in accordance with a shape of an article to be packed.

The tray-equipped pallet 2 includes: a tray 5 that includes a bottom surface 5a on which a product (article to be packed) is placed and side walls 5b formed upright on peripheral edges of the bottom surface 5a; and a pallet 6 that is fixed to a lower surface of the tray 5, wherein the buffer member 4 is disposed at four corners of the bottom surface 5a across a predetermined gap from the side wall 5b. A lower portion of the upper box 3 is provided with a through-hole 8b at a position corresponding to a through-hole 8a of the side wall 5b, wherein the through-holes 8a, 8b are aligned and the joint member 10 (see FIG. 2) is inserted into the aligned through-holes 8a, 8b, whereby the tray-equipped pallet 2 and the upper box 3 are integrally connected to each other.

A cut-and-raised piece (not shown) formed on the bottom surface 5a is inserted in a lower surface of the buffer member 4, each buffer member 4 is positioned at a predetermined position and deviation in a horizontal direction does not arise. In the meantime, the buffer member 4 may be fixed to the bottom surface 5a by means of another method such as bonding or the like.

The pallet 6 includes: a plurality of support portions 6a that are formed by folding, for example, a cardboard; ceiling plates (no shown) and a bottom plate 6b that are fixed to upper and lower surfaces of each support portion 6a, and an arm insertion hole 9, from which an arm of a forklift or a hand pallet (pallet transporting dolly) is inserted, is formed between the support portions 6a.

Next, a procedure of packing a product by using the packing box 1 shown in FIG. 1 is described. First, a product (not shown) is placed on the product placement surface 4a of the buffer member 4 that is disposed on the bottom surface 5a of the tray-equipped pallet 2. Next, when necessary, a buffer member is disposed on an upper surface and side surfaces of the product, and covered with the cylindrical upper box 3; thereafter, each flap 5 is raised upright. Finally, the through-hole 8a of the side wall 5b and the through-hole 8b of the upper box 3 are aligned with each other and the joint member 10 is inserted into the aligned through-holes 8a and 8b, whereby the tray-equipped pallet 2 and the upper box 3 are integrally connected to each other.

Figure 2:
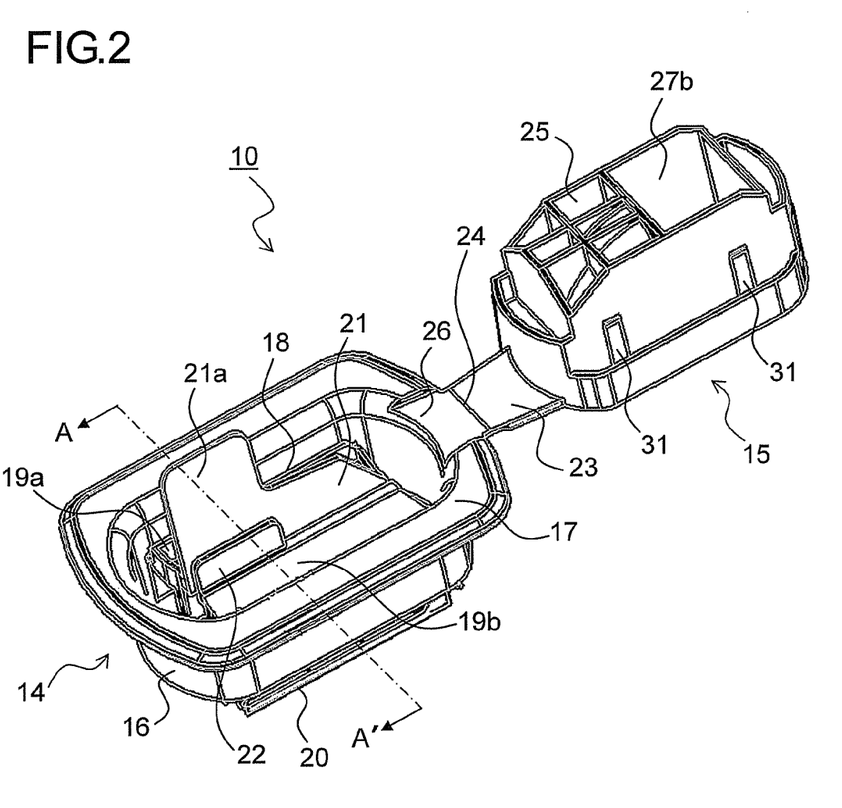
FIG. 2 is a perspective view showing a state before use of the joint member 10 according to an embodiment of the present disclosure.

FIG. 2 is a perspective view showing a state before use of the joint member 10 according to an embodiment of the present disclosure. As shown in FIG. 2, the joint member 10 is composed of a base member 14 and a key member 15 that is connected to the base member 14 by means of a connection piece 23. The base member 14 has a cylindrical portion 16, a flange portion 17 formed on an end of the cylindrical portion 16, and a pair of hook members 19a, 19b that are rotatably connected to opposite inner surfaces of the cylindrical portion 16 via first hinge portions 18. The flange portion 17 is provided with a concave portion 26 in which the connection piece 23 of the key member 15 is housed when inserting the key member 15 into the base member 14.

Figure 3:
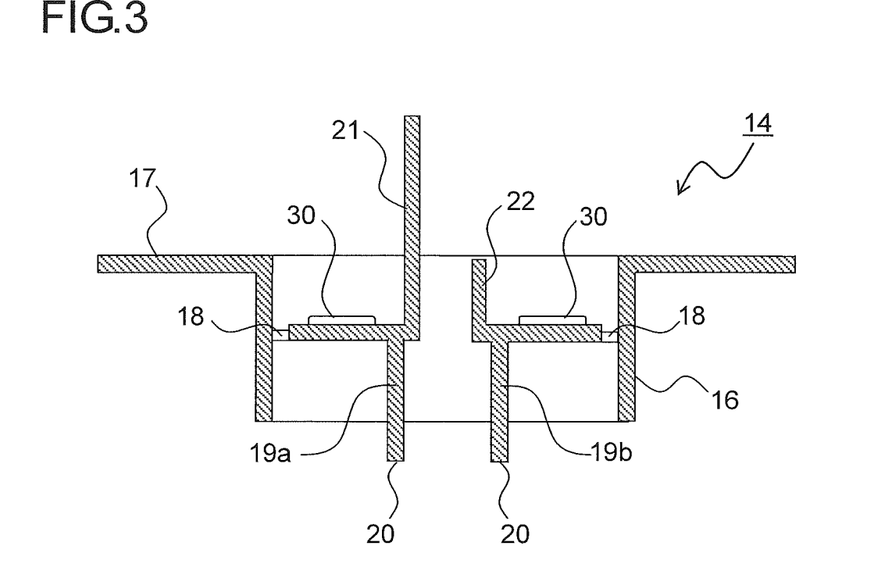
FIG. 3 is a side sectional view when seeing a base member 14 from a direction perpendicular to a first hinge portion 18.

FIG. 3 is a side sectional view (view when seeing from a AA' line of FIG. 2) when seeing the base member 14 from a direction perpendicular to the first hinge portion 18. As shown in FIG. 3, the hook members 19a, 19b are each bent into an L shape from the first hinge portion 18 as a base portion, and a tip end portion 20 protrudes from the cylindrical potion 16.

The hook members 19a, 19b are provided respectively with flat plate-shaped first and second ribs 21, 22 each of which extends from the bent portion in a direction (toward the flange portion 17) opposite to the tip end portion 20. The first rib 21 integrally formed with the hook member 19a has a wide portion 21a at a position distant from the connection piece 23 (see FIG. 2). Besides, the second rib 22 is formed at a position opposite to the wide portion 21a of the first rib 21, and the protrusion amount (height) is small compared with the wide portion 21a. Further, engagement protrusions 30 are formed on a surface butting against a pushing portion 25 of the key member 15 between the first hinge portions 18 of the hook members 19a, 19b and the bent portions.

The key member 15 has the pushing portion 25 that has an outer dimension substantially equal to an inner dimension of the cylindrical portion 16; by folding the connection piece 23 along the second hinge portion 24, it is possible to insert the pushing portion 25 into the cylindrical portion 16 of the base member 14. A surface of the pushing portion 25 butting against the hook members 19a, 19b is provided with slits 31 that engage with the engagement protrusions 30 of the hook members 19a, 19b.

Figure 4:
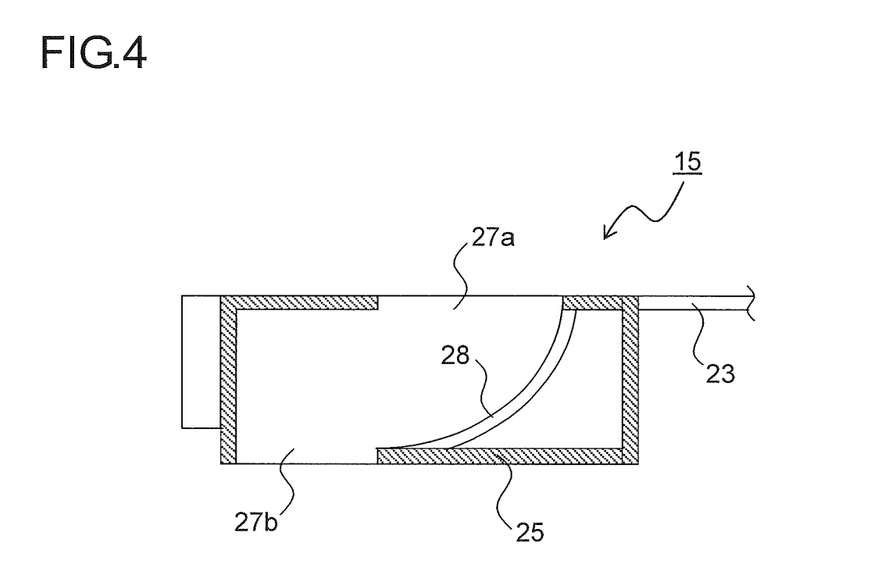
FIG. 4 is a side sectional view when cutting a key member 15 along a longitudinal direction.

FIG. 4 is a side sectional view when cutting a key member 15 along a longitudinal direction. In the meantime, in FIG. 4, the key member 15 is upside-down with respect to FIG. 2. An upper surface and lower surface of the key member 15 are provided respectively with a front-side opening 27a and a rear-side opening 27b, and a slope plate 28 having an arc shape in cross section is formed to connect the front-side opening 27a and the rear-side opening 27b to each other.

Operation of connecting the packing box 1 by using the joint member 10 having the above structure according to the present embodiment is described. First, the through-hole 8a of the side wall 5b of the tray-equipped pallet 2 and the through-hole 8b (see FIG. 1 as to both) of the upper box 3 are aligned with each other, and the base member 14 of the joint member 10 is inserted into the aligned through-holes 8a, 8b.

Figure 5:
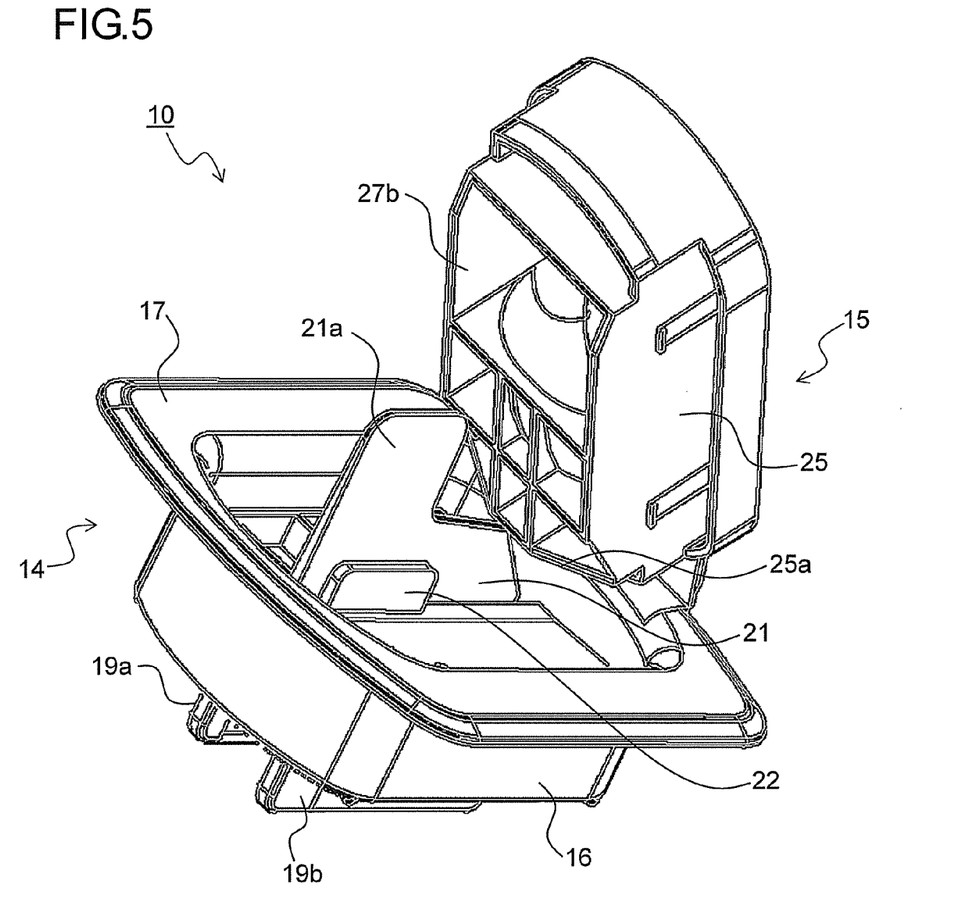
FIG. 5 is a perspective view showing a state where the key member 15 of the joint member 10 is rotated and folded toward the base member 14.
Figure 6:
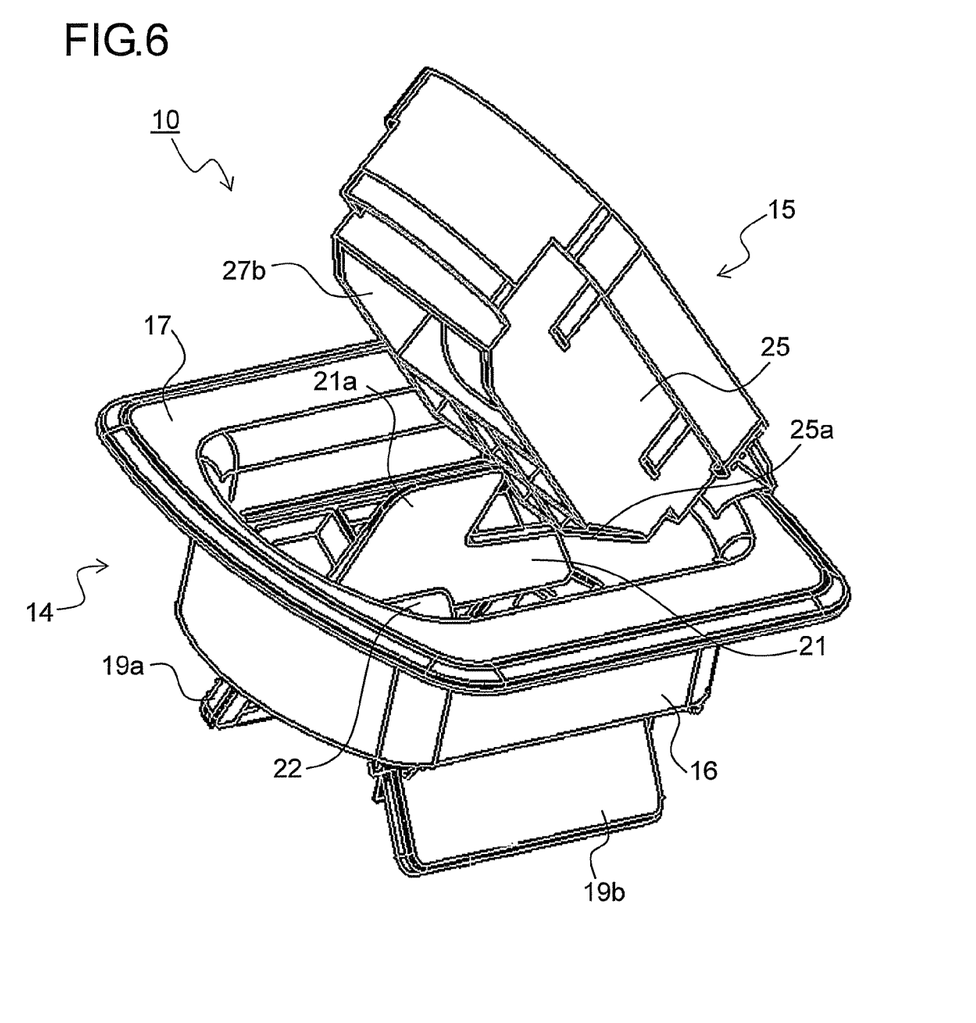
FIG. 6 is a perspective view showing a state where the key member 15 is further rotated from the state of FIG. 5 to make a pushing portion 25 butt against a first rib 21.
Figure 7:
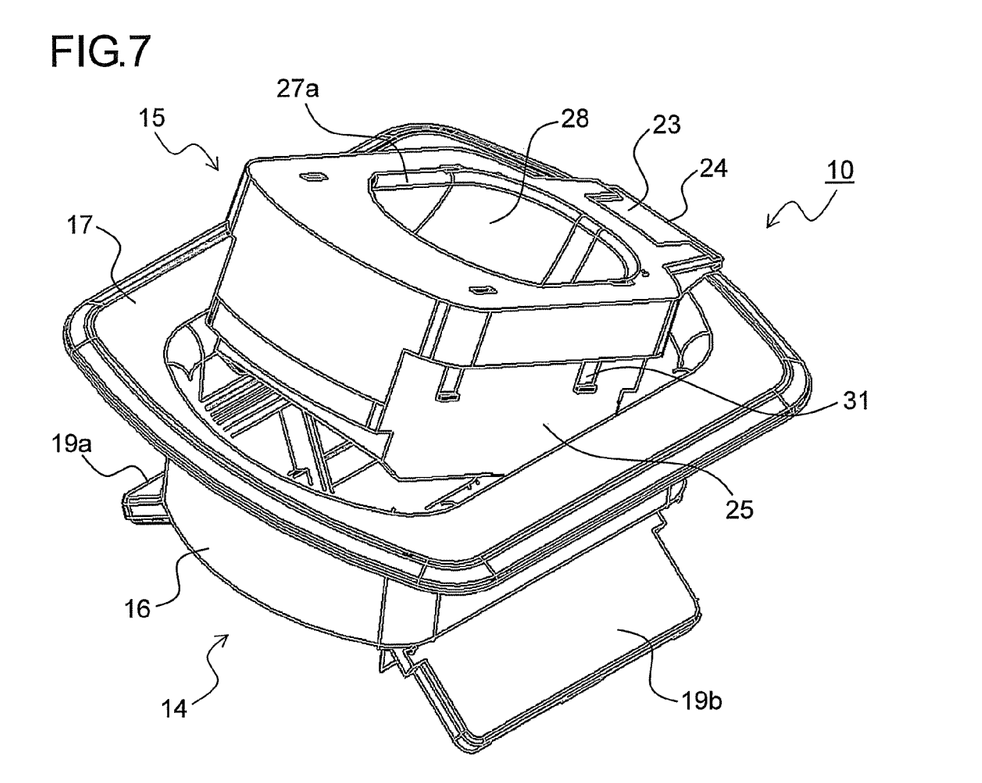
FIG. 7 is a perspective view when seeing, from obliquely above the key member 15, a state where the key member 15 is further rotated from the state of FIG. 6 to insert the pushing portion 25 through the flange portion 17 into the cylindrical portion 16.

Next, as shown in FIG. 5, the key member 15 is rotated along the second hinge portion 24 and folded toward the base member 14. In this way, as shown in FIG. 6, the pushing portion 25 butts against the rib 21 of the hook member 19a. And, in the state of FIG. 6, by inserting the pushing portion 25 into the cylindrical portion 16 through the flange portion 17, as shown in FIG. 7, the first rib 21 of the hook member 19a is pushed by the pushing portion 25, whereby the hook member 19a rotates, about the first hinge portion 18 as a pivotal shaft, in a direction (clockwise direction in FIG. 3) distant from the flange portion 17. Besides, thanks to the rotation of the hook member 19a, the first rib 21 pushes the second rib 22 from above; accordingly, the hook member 19b rotates in a direction (counterclockwise direction in FIG. 3) distant from the flange portion 17.

Here, as to the pushing portion 25, a portion near the second hinge portion 24 is formed into a chevron shape, and the first rib 21 is designed to always come into contact with one slope 25a of the pushing portion 25. In this way, there is not a risk that the first rib 21 falls in an opposite direction (left side of FIG. 3), and it is possible to surely rotate the hook member 19a in the direction distant from the flange portion 17.

In the meantime, in a case where the entirety of the first rib 21 in the longitudinal direction is formed to be wide, only the portion of the pushing portion 25 near the second hinge portion 24 comes into contact with the first rib 21; accordingly, the force for rotating the hook member 19a is unlikely to be transmitted, so that resistance when inserting the pushing portion 25 becomes large. In the present embodiment, the first rib 21 has the wide portion 21a at the position distant from the second hinge portion 24; accordingly, the portion of the pushing portion 25 distant from the second hinge portion 24 comes into contact with the wide portion 21a, while the portion near the second hinge portion 24 comes into contact with the portion (narrow portion of the first rib 21) other than the wide portion 21a. In this way, the pushing portion 25 can come into contact with a predetermined width portion in the longitudinal direction of the first rib 21 at substantially the same time, and it is possible to reduce the resistance when inserting the pushing portion 25. Thereafter, the first rib 21 further rotates downward to butt against the second rib 22 and rotates to a substantially horizontal position together with the second rib 22, whereby the insertion of the pushing portion 25 into the cylindrical portion 16 is completed.

Figure 8:
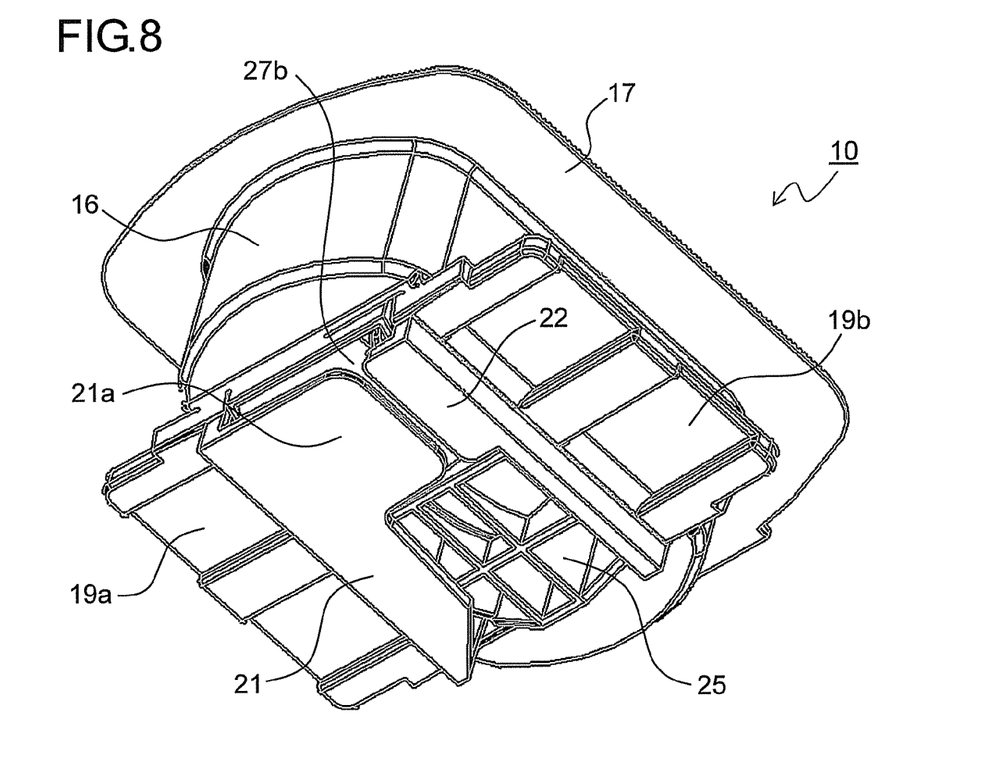
FIG. 8 is a perspective view when seeing, from an opposite side of the flange portion 17, a state where the key member 15 is fully inserted in the cylindrical portion 16.
Figure 9:
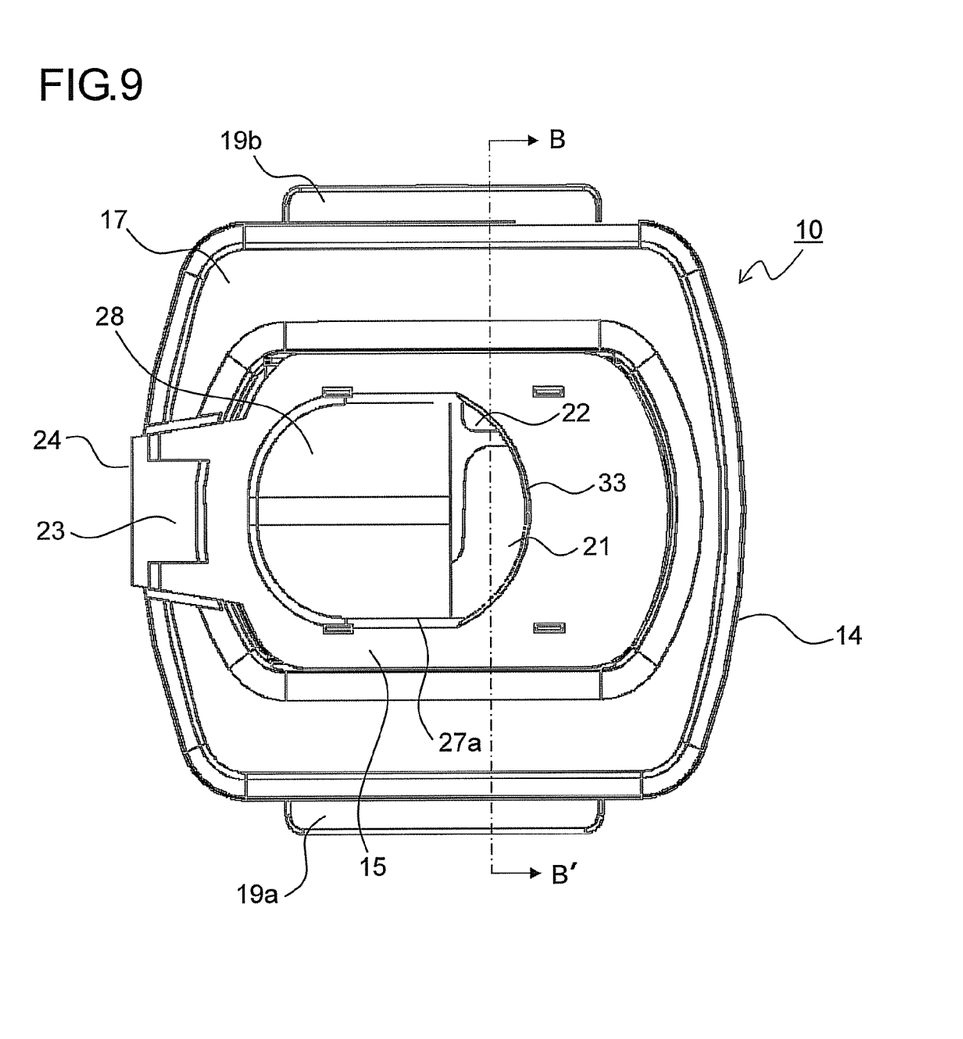
FIG. 9 is a front view when seeing, from a front side of the flange portion 17, the joint member 10 whose key member 15 is fully inserted in the cylindrical portion 16.
Figure 10:
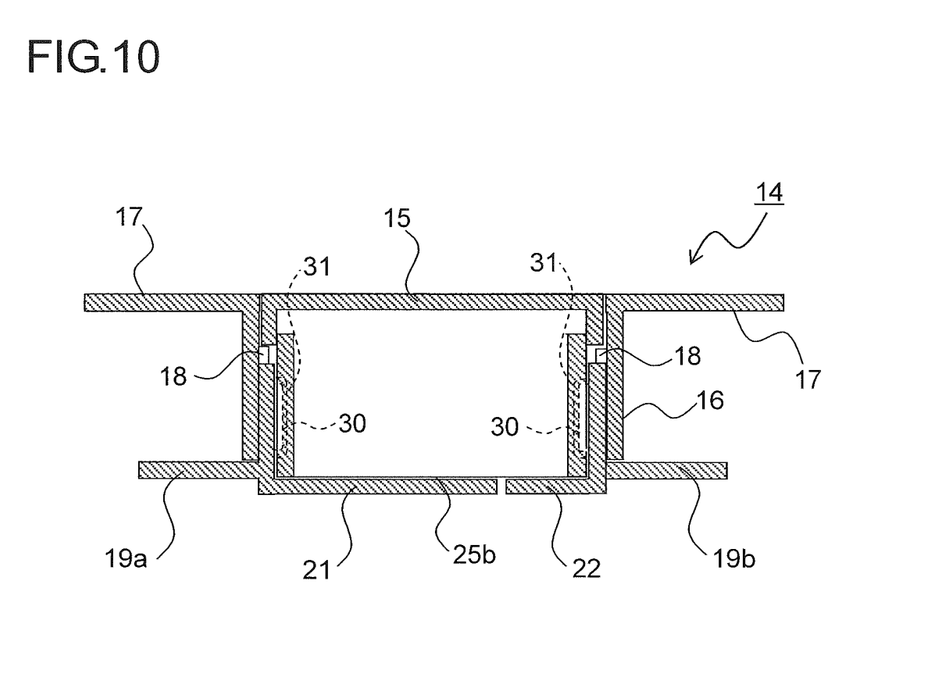
FIG. 10 is a side sectional view of the joint member 10 whose key member 15 is fully inserted in the cylindrical portion 16.

FIG. 8 is a perspective view when seeing, from the rear side of the flange portion 17, the joint member 10 whose the key member 15 is fully inserted in the cylindrical portion 16, FIG. 9 is a front view when seeing, from the front side of the flange portion 17, the joint member 10 whose key member 15 is fully inserted in the cylindrical portion 16, and FIG. 10 is a side sectional view (view when seeing from a BB' line of FIG. 9) of the joint member 10 whose key member 15 is fully inserted in the cylindrical portion 16. As shown in FIG. 8 to FIG. 10, in the state where the key member 15 is fully inserted in the cylindrical portion 16, the hook members 19a, 19b protrude from tip ends of the cylindrical portion 16 in a direction substantially parallel to the flange portion 17. At this time, the side wall 5b of the tray-equipped pallet 2 and the upper box 3 are sandwiched by the flange portion 7 and the hook members 19a, 19b.

And, when the hook members 19a, 19b are fully rotated by the pushing portion 25, the engagement protrusions 30 (see FIG. 3) of the hook portions 19a, 19b engage with the slits 31 of the pushing portion 25, so that the key member 15 and the base member 14 are fixed to each other. Besides, the first rib 21 and the second rib 22 are kept on substantially the same plane and oppose the rear-side opening 27b to close the rear-side opening 27b in a state where the tip end of the wide portion 21a of the first rib 21 and the tip end of the second rib 22 oppose each other.

In the state where the packing box 1 is connected as describe above, even in a case where external force for rotating the hook members 19a, 19b inward is exerted or in a case where the external force is not exerted, force for rotating the hook member 19a inward acts thanks to restoration force of the first hinge portion 18; accordingly, the pushing portion 25 is pushed back by the first rib 21. Because of this, there is a risk that the key member 15 and the base member 14 are disengaged from each other.

Accordingly, in the present embodiment, as shown in FIG. 10, a step is formed between each of the portions of the hook members 19a, 19b protruding in the direction substantially parallel to the flange portion 17 and each of the first rib 21 and the second rib 22, and when the key member 15 and the base member 14 are fixed to each other, the tip end 25b of the pushing portion 25 slightly protrudes from the cylindrical portion 16. In this way, the external force or restoration force for rotating the hook members 19a, 19b inward does not act on the tip end 25b of the pushing portion 25, but acts on a side surface of the pushing portion 25.

Accordingly, by engaging the engagement protrusions 30 of the hook members 19a, 19b with the slits 31 of the pushing portion 25 and making the tip end 25b of the pushing portion 25 protrude from the cylindrical portion 16, it is possible to firmly keep the engagement state of the key member 15 and the base member 14.

Besides, by forming an outer dimension of the wide portion 21a slightly smaller than an inner dimension of the rear-side opening 27b, when seeing from the rear-side opening 27b in the state where the hook members 19a, 19b are fully rotated by the pushing portion 25, the first rib 21 is located in an inner portion from the opening edge of the rear-side opening 27b. Accordingly, the force of the first rib 21 for pushing back the pushing portion 25 becomes unlikely to act, which is preferable.

On the other hand, when unpacking the packing box 1, a finger is inserted from the front-side opening 27a at the upper surface of the key member 15 along the slope plate 28 and put on an end edge 33 of the front-side opening 27a. And, the pushing portion 25 inserted in the cylindrical portion 16 is pulled out to free the fitting-in between the base member 14 and the key member 15. In this way, the hook members 19a, 19b become rotatable toward the flange portion 17; accordingly, the base member 14 is pulled out from the through-holes 8a, 8b to free the connection of the packing box 1.

In the meantime, as to the joint member 10 used for the packing, the hook members 19a, 19b are opened outward thanks to elastic deformation of the second hinge portion 18. Because of this, when inserting the base member 14 into the aligned through-holes 8a, 8b, there is a case where the smooth insertion is impossible because of the hook members 19a, 19b protruding outward from the cylindrical portion 16. Accordingly, in a case where the packing box 1 is repacked by using the joint member 10 that is once utilized, the first rib 21 is supported by means of a finger, the hook members 19a, 19b are rotated inward, then the base member 14 is inserted into the through-holes 8a, 8b, whereby it is possible to smoothly perform the working.

According to the joint member 10 of the present embodiment, the rear-side opening 27b is closed by the first rib 21 and the inside of the packing box 1 is shut off from outside in the state where the packing box 1 is connected. Accordingly, it is possible to effectively curb invasion of foreign matter, insects and the like from the rear-side opening 27b.

Besides, if an opening diameter of the front-side opening 27a is enlarged for easy insertion of a finger, an opening diameter of the rear-side opening 27b also becomes large. However, in the present embodiment, the rear-side opening 27b is closed by the first rib 21 and the second rib 22; accordingly, even if the front-side opening 27a is enlarged compared with the conventional structure, it is possible to curb invasion of foreign matter, insects and the like. Because of this, it becomes easy to insert a finger into the front-side opening 27a when unpacking the packing box 1, and also the operability when freeing the fitting-in between the base member 14 and the key member 15 improves.

Besides, only the first rib 21 may be formed on the hook member 19a (or the hook member 19b), but in this case, to completely close the rear-side opening 27b, it is necessary to form the first rib 21 having a size to extend near the opposing hook member 19b (or the hook member 19a) when the hook member 19a (or the hook member 19b) is rotated. Because of this, there is a risk that when inserting the key member 15 into the cylindrical portion 16 of the base member 14, the first rib 21 formed on the hook member 19a (or the hook member 19b) hits the opposing hook member 19b (or the hook member 19a).

Accordingly, it is preferable to form the first rib 21 and the second rib 22 on the hook members 19a, 19b, respectively. In this case, like in the present embodiment, by forming the two first rib 21 and second rib 22 different from each other in the protrusion amount on the hook members 19a, 19b, the first rib 21 having the larger protrusion amount comes into contact with the pushing portion 25 to start falling earlier than the second rib 22 having the smaller protrusion amount; accordingly, the first rib 21 rotates inward, butts against an upper end of the second rib 22 during the rotation to push down the second rib 22. Thanks to this operation, also the second rib rotates inward, so that the hook members 19a, 19b rotate outward. In this way, it is possible to prevent interference between the first rib 21 and the second rib 22 falling in the opposite directions when the hook members 19a, 19b rotate. And, the shapes (protrusion amounts) of the first rib 21 and second rib 22 are adjusted such that the first rib 21 and the second rib 22 close the rear-side opening 27b in the state where the hook members 19a, 19b rotate fully.

Besides, the present disclosure is not limited to the above embodiment, and various modifications are possible without departing from the spirit of the present disclosure. For example, in the above embodiment, the packing box 1, which uses the tray-equipped pallet 2 that includes the tray 5 and the pallet 6, is described; however, it goes without saying that the joint member 10 according to the present disclosure is also applicable to the packing box 1 that is not provided with the pallet 6 and includes only the upper case 3 and the tray 5.

The present disclosure is usable as a joint member that is inserted into aligned holes formed through packing members like such as a cardboard or the like to connect the packing members separated into two or more parts. Thanks to the use of the present disclosure, it is possible to provide a joint member that is easy to remove by putting a finger on a key member and can curb the invasion of foreign matter, insects and the like into a packing box by closing a hole at a position on which the finger is put.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A joint member that comprises a base member and a key member and is inserted into aligned through-holes of two or more packing members with the two or more packing members overlaid on each other to connect the packing members, wherein the base member includes:
    a cylindrical portion having a first opening at one end and a second opening at another end that is inserted into the through-hole;
    a flange portion that is formed on a peripheral portion of the first opening;
    a pair of hook members that are connected to opposite inner walls of the cylindrical portion, each hook member has a base portion which is connected to the inner wall and extends from the inner wall in opposite directions and bent into an L shape from the base portion toward the second opening; each of the hook members is swingable to the inner wall via the base portion as a first hinge portion;
    a rib that is formed on at least one of the hook members and extends from the bent portion of the hook member toward the first opening;
the key member includes:
    a pushing portion that is insertable and removable into and from the cylindrical portion of the base member through the first opening, comes into contact with the rib portion when being inserted into the cylindrical portion to rotate the hook member toward the second opening,
    a front-side opening through which a finger is insertable when pulling out the pushing portion from the cylindrical portion, and
    a rear-side opening that is formed to communicate with the front-side opening;
wherein the rib includes: a first rib formed on one of the hook members; and a second rib formed on another of the hook members, wherein the second rib is smaller than the first rib in protrusion amount;
    at least one of the first rib and the second rib is provided with a wide portion that opposes the rear-side opening in a state where the pushing portion is fully inserted in the cylindrical portion,
    a connection piece is formed on an end of the key member, the connection piece is connected to the base member via a second hinge portion that extends in a direction perpendicular to the first hinge portion, and the wide portion is formed at a position distant from the second hinge portion of the rib; and
    in a state where the pushing portion is fully inserted in the cylindrical portion, a tip end of the pushing portion protrudes from the cylindrical portion, the hook member rotates, about the first hinge portion as a pivotal shaft, toward the second opening, the flange portion and the hook member sandwich the two or more packing members, and the rib closes the second opening.

2. The joint member according to claim 1, wherein the pushing portion is provided with a slope that comes into contact with at least one of the first rib and the second rib to rotate the respective hook member toward the second opening.

3. The joint member according to claim 1, wherein an engagement protrusion is formed on a surface butting against the pushing portion between the first hinge portion of the hook member and the bent portion, the pushing portion is provided, on a surface butting against the hook member, with a slit that is able to engage with the engagement protrusion, wherein
the engagement protrusion engages with the slit in a state where the pushing portion is fully inserted in the cylindrical portion.

4. A packing box that is connected by means of the joint member according to claim 1.

* * * * *